3,149,141
PREPARATION OF ALKYL ISOTHIOCYANATES
James T. Venerable, Huntley, James Miyashiro, Woodstock, and Philip L. Weyna, Crystal Lake, Ill., assignors, by mesne assignments, to Morton Salt Company, Chicago, Ill., a corporation of Delaware
Filed June 29, 1961, Ser. No. 120,697
7 Claims. (Cl. 260—454)

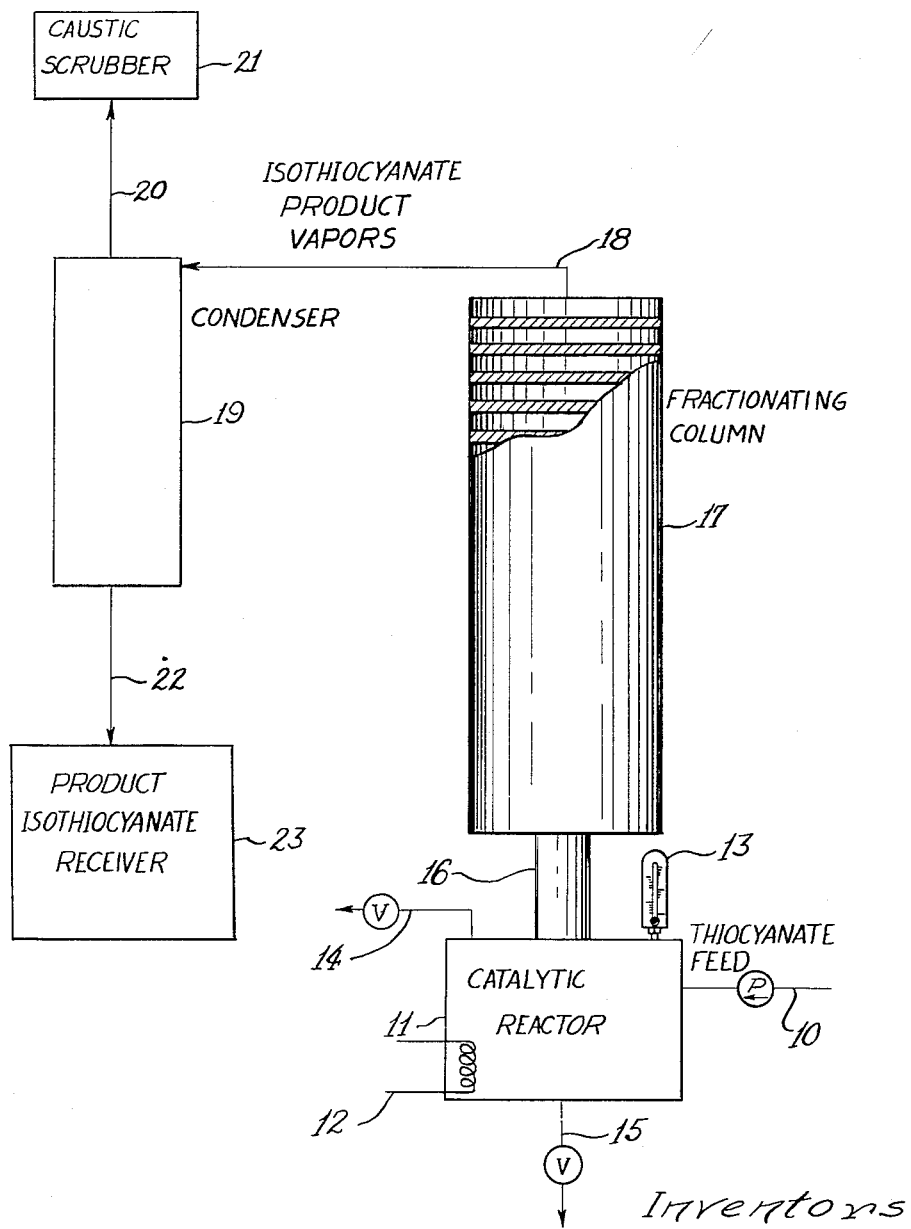

This invention relates to a continuous process for the manufacture of organic isothiocyanate compounds, and particularly relates to the catalytic isomerization of alkyl thiocyanates to the corresponding alkyl isothiocyanates.

Alkyl isothiocyanates are highly useful chemical compounds per se in the field of agricultural chemistry and as intermediates for the preparation of other organic compounds such as substituted thioureas and the like.

The production of alkyl isothiocyanates has been attempted by isomerization procedures wherein high temperatures are employed to rearrange the corresponding alkyl thiocyanates. These methods are quite satisfactory for the conversion of allyl thiocyanates and substituted allyl thiocyanates to the corresponding isothiocyanate compounds. However, these procedures are not generally satisfactory with respect to isomerization of alkyl thiocyanates. The alkyl thiocyanates are reported to isomerize with difficulty and by an entirely different mechanism, if at all. Prior art workers have succeeded in isomerizing alkyl thiocyanates such as methyl thiocyanate to some degree utilizing high temperatures and a variety of catalysts for the reaction. Generally these prior art procedures lead to the formation of substantial quantities of undesired by-products with relatively low conversion of the alkyl thiocyanates to the alkyl isothiocyanates. Moreover, the lives of the catalysts, some of which are quite costly, are relatively short, requiring replenishment of the catalyst at frequent intervals. Thus, because of the low conversion, the formation of large amounts of undesired by-products and catalyst costs, the prior art isomerization procedures are generally not satisfactory for the preparation of alkyl isothiocyanates on a commercial scale.

The present invention provides an improved process for the manufacture of alkyl thiocyanates from the corresponding alkyl isothiocyanates. The process of the invention which can be carried out continuously and for an extended period provides a low cost commercial method for isomerization of alkyl thiocyanates to the corresponding alkyl isothiocyanates in desirably high yields.

The process of the present invention is predicated upon the discovery that by carrying out the isomerization of alkyl thiocyanates for extended periods of time under certain conditions a characteristic phenomenon occurs whereby the original reaction becomes autocatalytic. More particularly, it has been found that by heating in a reaction zone liquid alkyl thiocyanates to the reflux temperature of the reaction mixture while maintaining in contact therewith at least a portion of the vapor produced, an autocatalytic isomerization reaction occurs which can be carried out in continuous manner. While we do not wish to be bound by any theoretical explanation of this discovery, we believe that a natural catalyst is slowly formed in the reaction zone between the feed material and the products produced therein. This natural catalyst promotes at relatively low temperatures the conversion of the alkyl thiocyanates to the corresponding alkyl isothiocyanates with the yield of isothiocyanate product being desirably high, usually on the order of 90% or more. After initiation of the isomerization reaction it is necessary to continuously remove from the system the alkyl isothiocyanate produced in order to operate continuously since the presence of large amounts of alkyl isothiocyanate in the reaction zone promotes the formation of by-products. Some of the catalytic mixture must also be drained from the reaction zone from time to time in order to keep the catalyst activity at the desired level and thereby operate in a steady state manner.

In carrying out the continuous isomerization process in accordance with one embodiment of the invention, a liquid alkyl thiocyanate feed is introduced into a reactor and heated to its boiling point to initiate isomerization. The specific temperatures to employ thus depend upon the boiling point of the alkyl thiocyanate feed. The boiling point of a given reaction mixture also depends upon its composition. Alkyl isothiocyanates generally boil lower than the corresponding thiocyanates and thus tend to lower the boiling point. Non-volatile by-products which accumulate in the reaction mixture tend to raise the boiling point. Therefore, it is possible to regulate the reaction temperature by controlling the composition of the materials in the reaction zone. It is generally desirable to avoid the use of exceedingly high temperatures which tend to cause the formation of a disproportionate amount of undesirable by-products. Thus, for example, with a methyl thiocyanate feed, reactor temperatures in the range from about 130–160° C. are preferred. The vapors leaving the reaction zone are refluxed thereto to insure the presence within the reaction zone of both the alkyl thiocyanate feed and the alkyl isothiocyanate product to produce a natural catalyst and thereby achieve autocatalytic conversion of the thiocyanate feed. Initially, the alkyl isothiocyanate content of the vapors leaving the reaction zone is low but gradually builds up as the formation of the natural catalyst within the reaction zone proceeds. Preferably in the initial stages of the reaction, total reflux of the vapors leaving the reaction zone is effected until the alkyl isothiocyanate content of these vapors is from 5 to 40%, preferably from 20 to 30% by weight. The time required to achieve this concentration of alkyl isothiocyanate product in the reaction vapors may range from several hours up to several days or more. When the isothiocyanate content of the vapors leaving the reaction zone reaches the desired operating level, the alkyl isothiocyanate product is continuously removed from the system. During this stage of operation, the vapors from the reaction zone are fractionated in a conventional manner, taking advantage of the differences in boiling points of the alkyl isothiocyanates and the corresponding alkyl thiocyanates. The unconverted alkyl thiocyanates present in the reaction vapors are refluxed to the reaction zone for further isomerization. The alkyl isothiocyanate produced is continuously removed from the system at a rate sufficient to maintain the concentration thereof in the vapors leaving the reaction zone at the desired operating level. It is essential that the alkyl isothiocyanate product be continuously removed from the system, since the presence of this material in the reaction zone promotes the formation of by-product. Generally, the alkyl isothiocyanate content in the vapors leaving the reaction zone is not permitted to exceed about 60% by weight. On the other hand, a certain minimum level of alkyl isothiocyanate product must be maintained in the vapors leaving the reaction zone in order to obtain a reasonable production rate in a given fractionating column. Additional alkyl thiocyanate feed material is added to the isomerization reaction at approximately the same rate as the alkyl isothiocyanate product is distilled off and removed from the system, thus giving rise to a continuous isomerization process which is autocatalytic in nature. Once in operation, this isomerization process can be continued indefinitely.

The operation of the process of the present invention is further described with particular reference to the drawing.

A liquid alkyl thiocyanate feed is introduced through line 10 into reactor 11 which is provided with a suitable heater 12. Reactor 11 is also provided with means for receiving thermometer 13 as well as sample withdrawal line 14 and drain line 15. Reactor 11 is operated at the reflux temperature of the reaction mixture. The vaporous products issuing from reactor 11 are fed through conduit 16 into fractionation column 17. The column 17 contains sufficient theoretical plates and is operated at a suitable temperature which permits optimum separation of the alkyl thiocyanate and alkyl isothiocyanate isomers. In the initial stages of the isomerization reaction, fractionating column 17 is operated at high reflux ratios and preferably under conditions of total reflux to permit build-up of the alkyl isothiocyanate concentration within the reaction vapors to a desired level of approximately from 20 to 30%. After the concentration of alkyl isothiocyanate in the reaction vapors has attained the desired operating level and the rate of formation of isothiocyanate has increased substantially, the reflux ratio at which the fractionating column is operated is reduced with the alkyl isothiocyanate product being taken off at a rate substantially equal to its rate of formation. Alkyl isothiocyanate product vapors issue from fractionating column 17 and pass through line 18 into condenser 19 having a fixed gas vent 20. The gases escaping through vent 20 may contain some obnoxious odors and can be subjected to caustic scrubbing in scrubber 21. The alkyl isothiocyanate product condensing in condenser 19 is taken off through line 22 and collected in receiver 23.

The progress of the isomerization reaction can be followed by withdrawing a sample of vaporous products through sample withdrawal line 14 and observing the refractive index of the sample. Comparison of the observed value with a refractive index-composition chart for the particular thiocyanate-isothiocyanate system indicates the extent of isomerization by revealing the concentration of the isothiocyanate product in the reaction mixture. For example, the $n_D^{40}$ for methyl thiocyanate is 1.4582; that of methyl isothiocyanate is 1.5245. This information can be utilized for controlling the operating conditions of the fractionating column 17. Thus, for example, when the concentration of the alkyl isothiocyanate in the reaction mixture is below the desired operating value, the column is operated at a high reflux ratio or at total reflux. As the concentration of alkyl isothiocyanate in the reaction mixture approaches the value selected for normal operation, the reflux ratio of fractionating column 17 is reduced so that the alkyl isothiocyanate product is removed from the system at substantially the same rate as it is being formed in the reactor.

During the course of the herein described isomerization reaction a residue having a tar-like nature and comprising non-volatile products of the isomerization reaction accumulates in the reactor 11. This non-volatile residue is a tar-like mixture, the chemical composition of which is not definitely known. However, it has been determined that the major portion of the residue comprises a trimer of the alkyl thiocyanate feed material which in the case of a methyl thiocyanate feed would be trimethyl trithiocyanate. This trimeric material is substantially completely inactive as an isomerization catalyst and can be readily separated from the active isomerization catalyst found in the reactor residue by extraction with such solvents as benzene and the like. The active isomerization catalyst which generally comprises a minor portion of the reactor residue and may be on the order of 5–10% by weight of the total residue, appears to be a resinous polymeric material which is insoluble in most organic solvents but soluble in methyl thiocyanate, chloroform and dimethyl formamide. The infrared spectrum of the active catalyst material is complex but is significantly void in the region where thiocyanate and isothiocyanate groups are found. Analysis of the active catalyst indicates that it contains a greater percentage of carbon and nitrogen and a smaller percentage of hydrogen and sulfur than the alkyl thiocyanate from which it is formed. The accumulation of the residue in the reactor reduces the amount of alkyl thiocyanate feed which can be present and available for isomerization and also tends to raise the reactor pot temperature. The pot temperature will vary with the reactants employed but should not be allowed to increase substantially if the production of undesired by-products is to be kept at a minimum. Observation of the temperature within the reactor serves to indicate the necessity for removing a portion of the accumulated non-volatile residue from the reactor. When the temperature within the reactor is observed to rise significantly above the desired operating temperature, a portion of the accumulated non-volatile residue contained in the reaction mixture is drained from the reactor through drain line 15 and replaced by fresh feed material. In this way the temperature is controlled within the desired operating range. The thiocyanate and isothiocyanate values in the drained material can be recovered and recycled.

The natural catalyst resulting from a previous isomerization reaction can be employed initially in the continuous isomerization process of this invention to reduce the start-up time. A portion of the tarry residue obtained from a previous isomerization reaction can be employed in the form in which it is removed from the reactor without any purification treatment or separation of the non-active trimeric compounds normally present herein. When sufficient amounts of the natural catalyst from a previous isomerization reaction are employed in this manner, it is generally not necessary to employ a high reflux of the alkyl isothiocyanate product to the reaction zone during the initial stages of the reaction. Take-off of the isothiocyanate product at substantially the same rate as it is being formed can be effected during the course of the entire isomerization reaction, without the necessity of refluxing the alkyl isothiocyanate product initially in order to form a useful amount of the natural catalyst.

It is also within the scope of the present invention to employ known isomerization catalysts at the start of the isomerization reaction to speed up the reaction of the alkyl thiocyanates to the alkyl isothiocyanates while a sufficient concentration of the natural catalyst is being formed in the reactor. After the concentration of the natural catalyst in the reaction mixture attains the desired operating level, the need for the known isomerization catalyst no longer exists, and of course it is not necessary to replenish this catalyst. Among such known catalysts which can be utilized initially in the isomerization reaction of the invention are cadmium iodide, ammonium iodide, zinc chloride and the like.

The process of the present invention can be advantageously employed for isomerization of alkyl thiocyanates in general, and particularly for the lower alkyl thiocyanates having alkyl groups containing from about 1 to 4 carbon atoms which are ordinarily the most difficult to isomerize by prior art processes. As stated previously, the isomerization reaction is carried out at the reflux temperature of the reaction mixture and thus the temperature at which the reaction is operated depends upon the boiling point of the particular alkyl thiocyanate feed. Thus, for example, for isomerization of methyl thiocyanate the isomerization reactor is operated at a temperature from about 130° C. to 160° C. With higher boiling alkyl thiocyanate compounds correspondingly higher reaction temperatures are employed. However, unnecessarily high reaction temperatures are to be avoided because of the tendency to form undesired by-products at high temperatures. Fractionating column 17 can be operated under reduced pressure when treating butyl thiocyanate and higher boiling members of the alkyl thiocyanate series to reduce the reaction temperature thereby minimizing any tendency for decomposition of the reaction components at elevated temperatures.

The amount of water present in the alkyl thiocyanate feed material is relatively important with respect to the yield and quality of the alkyl isothiocyanate obtained by the continuous isomerization process of the invention. The presence in the alkyl thiocyanate feed of small amounts of water causes volatile impurities to form which contaminate the alkyl isothiocyanate product and also causes the accumulation of excessive amounts of non-volatile by-products in the reaction zone. The formation of these by-products reduces the overall yield and thus increases the cost of the alkyl isothiocyanate produced. While the present isomerization process is operable with feeds containing relatively large amounts of water, it is preferred that the water content of the alkyl isothiocyanate feed which is employed in the process of the present invention be less than about 0.1% and preferably less than about 0.01%. Removal of water from the alkyl isothiocyanate feed can be accomplished by azeotropic distillation or by treatment with certain drying agents such as molecular sieves and the like.

The following examples further illustrate the present invention.

Example 1

A hundred parts of crude, wet methyl thiocyanate prepared by the method of Walden described in Berichte 40, 3215 (1907), were placed in a still and approximately 50% of it distilled off to azeotropically remove water present therein. The condenser was then rearranged and the mixture refluxed for 24 hours to initiate catalyst formation. At the end of this time the methyl isothiocyanate content of the refluxing vapors was approximately 25% by weight. The reaction mixture was then considered ready for use as the initial charge in the continuous isomerization process of the invention.

The mixture obtained by the foregoing procedure was transferred to a catalytic reactor vessel of the type described previously and illustrated by the attached drawing. This reaction mixture was heated to reflux with an initial reaction temperature of approximately 134° C. The methyl isothiocyanate product was collected at a very slow rate using a relatively high reflux ratio. Three parts of product were collected in the first 4 hours, but the methyl isothiocyanate content of the vapors leaving the reaction zone dropped to 10%, indicating a low level of catalyst activity. The apparatus was set for total reflux for 10 additional hours to build the concentration of methyl isothiocyanate in the vapors entering the fractionating column back up to 25% by weight. The equipment was then set for a slow take off, and eight parts of product were collected during the next 17 hours (0.47 part per hour). The concentration of methyl isothiocyanate in the reactor vapors held between 20 and 25%, indicating a build-up of catalytic activity. Fresh methyl thiocyanate was added to replace the material that was removed and thus maintain the contents of the catalytic reactor at the operating level. The operation was continued for three days during which time the take-off rate was gradually increased to 0.76 part per hour. The concentration of methyl isothiocyanate in the reactor vapors had now climbed to 29% and the temperature of the refluxing reaction mixture was in the range of 132–133° C. After six days the product take-off rate was increased to 1.6 parts per hour, while the concentration of methyl isothiocyanate in the reaction vapors remained in the range of about 30–36% by weight. Meanwhile, the reflux temperature of the reaction mixture increased, indicating a build-up of non-volatile by-products in the reactor. When the temperature reached 136° C., one part of the reaction mixture was drained from the catalytic reactor and replaced by methyl thiocyanate. Similar quantities were removed periodically, as necessary, to hold the reactor temperature in the range of about 135–137° C. The system was now approaching the steady state conditions required for continuous operation.

After ten days of operation, the production rate was steady at 2 parts per hour. The reaction temperature was controlled at 136–137° by draining a portion of the reaction mixture and replacing it with the methyl thiocyanate feed at the rate of about 0.5 part per hour. The methyl isothiocyanate level in the vapors leaving the reaction mixture was steady at 30% by weight. The material drained from the reactor consisted of approximately 40% non-volatiles and 60% of a mixture of methyl thiocyanate and methyl isothiocyanate. The latter two materials were recovered by vacuum distillation and recycled. The non-volatile material was composed of approximately 90% of the trimer, trimethyl trithiocyanate, and approximately 10% of a relatively insoluble material that possessed catalytic activity for the isomerization.

Example 2

A 235 gram portion of the material remaining in the reactor from an isomerization run such as that described in Example 1, was diluted with 265 grams of fresh methyl thiocyanate and subjected to isomerization. The initial pot temperature was about 133.5° C. and the take-off rate was 17.8 grams per hour. The run was continued for six days during which time the reaction temperature increased to 156° C. (21° of which occurred during the last nine hours). The reflux ratio was reduced during the course of the experiment and the take-off rate increased to 43 grams per hour. The isomerization run was then terminated. A total of 5,148 grams of methyl thiocyanate was pumped into the system during the six days, producing 4641 grams (90.2% yield) of methyl isothiocyanate product, 308 grams (6.0%) of non-volatiles, 135 grams (2.6%) of a recoverable methyl thiocyanate-methyl isothiocyanate mixture which accumulated in the reactor and the remaining 64 grams were represented by samples (1.0%) and unaccountables (0.2%).

Example 3

A 500 grams charge of methyl thiocyanate and 27 grams (5.4% by weight) of tetraethylammonium bromide were placed in a 1-liter reaction flask fitted with a fractionating column, a magnetic stirrer, a thermometer, a heating mantle and a metering pump. The reaction mixture was heated and a gas was observed leaving the system through the absorption trap as the quaternary salt was rapidly converted into tetraethylammonium thiocyanate and volatile methyl bromide. After three hours the reactor temperature was about 131° C. and the concentration of methyl isothiocyanate in the vapors leaving the reaction zone had reached 16.5%. Take-off of methyl isothiocyanate product was initiated, employing a relatively high reflux ratio. During the next eight days the reaction temperature increased to 143° C. in an accelerating manner, 7° of the rise coming in the last twenty-four hours. The isomerization rate also increased in an accelerating manner. Most of the increase was attributed to the increasing concentration of the non-volatile catalyst formed during the course of the run. As the reaction rate increased, the reflux ratio was decreased. The product take-off rate was increased during the eight-day period from 17 grams per hour to 66 grams per hour. A total of 6900 grams of methyl thiocyanate was pumped into the system of which 6051 grams (87.8% yield) were collected as methyl isothiocyanate product, 435 grams (6.3%) were converted into trimer, catalyst and other non-volatile by-products, 350 grams (5.1%) of a methyl thiocyanate-methyl isothiocyanate mixture accumulated in the reactor and 64 grams (0.9%) were removed from the system as samples.

Example 4

The process of Example 3 was repeated, utilizing tetramethylammonium thiocyanate to initiate the isomerization reaction.

Example 5

The process of Example 3 was repeated, utilizing tetrabutylammonium thiocyanate to initiate the isomerization reaction.

Example 6

The process of Example 3 was repeated, utilizing tetrapropylammonium thiocyanate to initiate the isomerization reaction.

Example 7

The process of Example 3 was repeated, using ethyl thiocyanate as the alkyl thiocyanate and forming ethyl isothiocyanate as the product.

Example 8

The process of Example 3 was repeated, with n-butyl thiocyanate to give a product of n-butyl isothiocyanate.

The process of the invention is peculiarly advantageous. It provides a commercial method for continuous production of alkyl isothiocyanates in high yields from the corresponding alkyl thiocyanate compounds. It avoids the necessity of frequent replacement of catalysts as in prior art processes and significantly reduces the undesired by-product formation.

Those modifications and equivalents which fall within the spirit of the invention and the scope of the appended claims are to be considered part of the invention.

We claim:

1. A continuous process for manufacturing an alkyl isothiocyanate which comprises isomerizing a corresponding liquid alkyl thiocyanate containing from 1 to 4 carbon atoms in the alkyl group in a reaction zone provided with an isomerization catalyst; the said isomerization catalyst consisting essentially of the non-volatile residue resulting from:
   (1) heating a liquid alkyl thiocyanate at its reflux temperature for a period of time sufficient to cause isomerization to the corresponding isothiocyanate.
   (2) maintaining a reflux of vapors until the alkyl isothiocyanate content thereof is in the range of from about 5 to about 40% by weight,
   (3) then fractionating the vapors from said reaction zone to separate an alkyl isothiocyanate product and unreacted alkyl thiocyanate,
   (4) continuously removing the said alkyl isothiocyanate product from the system while returning to the reaction zone unconverted alkyl thiocyanate,
   (5) adding fresh alkyl thiocyanate feed to the reaction zone at substantially the same rate as the alkyl isothiocyanate product is removed from the system, while
   (6) maintaining in contact with said isomerization catalyst a portion of the vapors produced, whereby said process produces the aforesaid alkyl isothiocyanate product and additional said isomerization catalyst.

2. The process of claim 1 wherein the alkyl thiocyanate is methyl thiocyanate and the alkyl isothiocyanate is methyl isothiocyanate.

3. The process of claim 1 wherein the alkyl thiocyanate is ethyl thiocyanate and the alkyl isothiocyanate is ethyl isothiocyanate.

4. The process of claim 1 wherein the alkyl thiocyanate is butyl thiocyanate and the alkyl isothiocyanate is butyl isothiocyanate.

5. The process of claim 1 wherein the alkyl isothiocyanate content of the reflux vapors referred to in the numbered subparagraph (2) of claim 1 is in the range of from about 20 to 30 percent by weight.

6. The process of claim 1 wherein the alkyl thiocyanate is methyl thiocyanate, the alkyl isothiocyanate is methyl isothiocyanate and the methyl isothiocyanate content of the reflux vapors referred to in the numbered subparagraph (2) of claim 1 is in the range of from about 20 to 30 percent by weight.

7. A continuous process for manufacturing methyl isothiocyanate from methyl thiocyanate which comprises heating liquid methyl thiocyanate in a reaction zone to a temperature of about 132° C., refluxing the vapors from said reaction zone, continuing the total reflux of said vapors until the content of methyl isothiocyanate in the vapors corresponds to from about 20 to 30% by weight thereof, and then reducing the reflux ratio and distilling off methyl isothiocyanate at a rate to maintain the concentration of methyl isothiocyanate in the vapors leaving the reaction zone at from about 20 to about 30% by weight, and adding fresh methyl thiocyanate feed to the reaction zone at substantially the same rate as the methyl isothiocyanate product is distilled off, whereby a natural catalyst is formed in the reaction zone to promote the isomerization of methyl thiocyanate to methyl isothiocyanate.

References Cited in the file of this patent
UNITED STATES PATENTS 2,954,393   Haimsohn et al. _____ Sept. 27, 1960

OTHER REFERENCES

Smith et al.: Jour. Am. Chem. Soc., vol. 82, p. 3076–3082 (1960).